(12) United States Patent
Terasawa et al.

(10) Patent No.: US 11,420,335 B2
(45) Date of Patent: Aug. 23, 2022

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Ryo Terasawa, Tokyo (JP); Masaya Kinoshita, Saitama (JP); Kazuo Hongo, Chiba (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 16/962,613

(22) PCT Filed: Oct. 30, 2018

(86) PCT No.: PCT/JP2018/040276
§ 371 (c)(1),
(2) Date: Jul. 16, 2020

(87) PCT Pub. No.: WO2019/146201
PCT Pub. Date: Jan. 8, 2019

(65) Prior Publication Data
US 2020/0406465 A1    Dec. 31, 2020

(30) Foreign Application Priority Data
Jan. 23, 2018 (JP) .............................. JP2018-008846

(51) Int. Cl.
*B25J 13/08*    (2006.01)
*B25J 9/16*    (2006.01)
(Continued)

(52) U.S. Cl.
CPC ........... *B25J 9/1697* (2013.01); *B25J 9/1612* (2013.01); *B25J 9/1669* (2013.01); *B25J 13/02* (2013.01); *B25J 13/089* (2013.01); *G05D 1/0234* (2013.01)

(58) Field of Classification Search
CPC ...... B25J 9/1697; B25J 9/1612; B25J 9/1669; B25J 13/02; B25J 13/089; G05D 1/0234
(Continued)

(56) References Cited

U.S. PATENT DOCUMENTS

2016/0001448 A1* 1/2016 Rothfuss ................. B25J 15/028
    901/31
2016/0059408 A1* 3/2016 Isobe ....................... B25J 5/007
    901/29
(Continued)

FOREIGN PATENT DOCUMENTS

EP    2993002 A1    3/2016
JP    S60-015780 A    1/1985
(Continued)

*Primary Examiner* — Dalena Tran
(74) *Attorney, Agent, or Firm* — Paratus Law Group, PLLC

(57) ABSTRACT

There is provided an information processing apparatus to estimate a position of a distal end of a movable unit with a reduced processing load, the information processing including a position computer that computes, on the basis of first positional information obtained from reading of a projected marker by a first visual sensor and second positional information including positional information obtained from reading of the marker by a second visual sensor that moves relative to the first visual sensor, a position of a movable unit in which the second visual sensor is disposed. This makes it possible to estimate the position of the distal end of the movable unit with a reduced processing load.

16 Claims, 7 Drawing Sheets

(51) Int. Cl.
*B25J 13/02* (2006.01)
*G05D 1/02* (2020.01)

(58) Field of Classification Search
USPC ........ 700/259, 245, 258, 254; 600/117, 182,
600/424; 901/1, 2, 30, 46, 47; 414/2, 3,
414/751.1; 318/567, 568.11, 568.21
See application file for complete search history.

(56) References Cited

U.S. PATENT DOCUMENTS

2019/0001491 A1\* 1/2019 Umeyama ................ B25J 13/02
2019/0001508 A1\* 1/2019 Li ........................ G05B 13/041
2019/0176326 A1\* 6/2019 Bingham ................ B25J 9/161

FOREIGN PATENT DOCUMENTS

| JP | 2007-319938 A | 12/2007 |
| JP | 2010-127719 A | 6/2010 |
| JP | 2017-076309 A | 4/2017 |
| JP | 2017-124448 A | 7/2017 |
| WO | WO 2019/021058 A2 | 1/2019 |

\* cited by examiner

[FIG. 1]
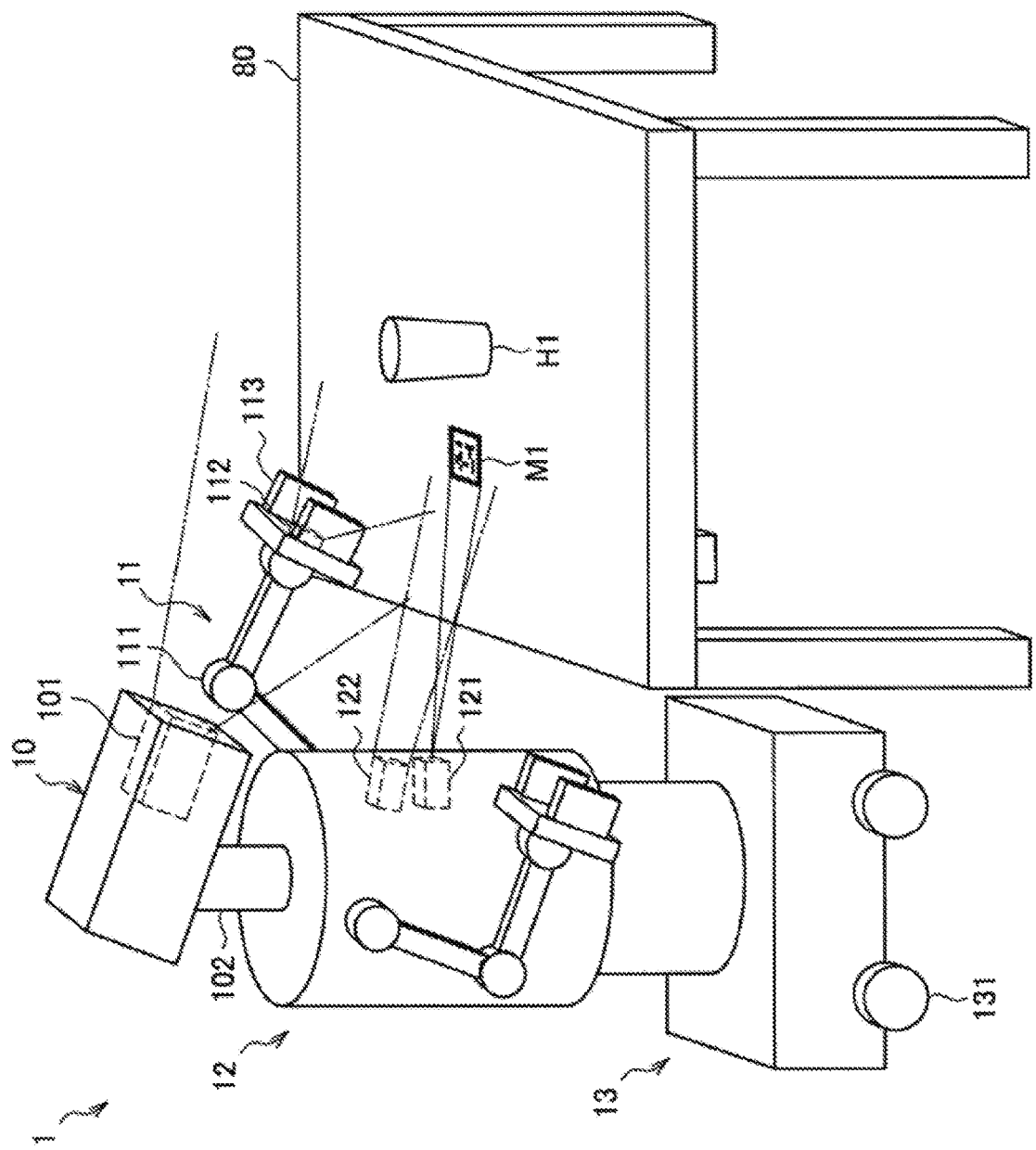

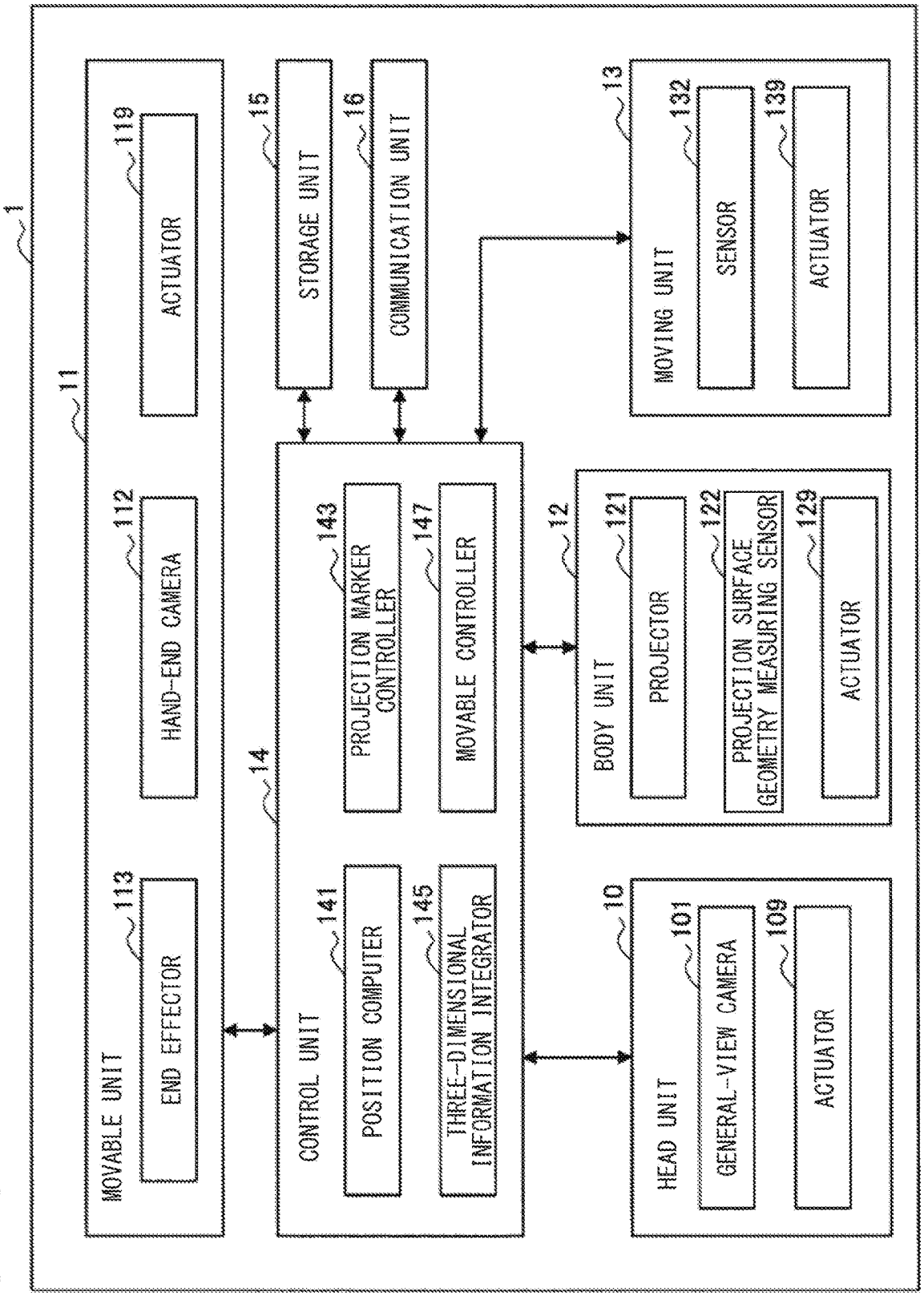
[FIG. 2]

[FIG. 3]
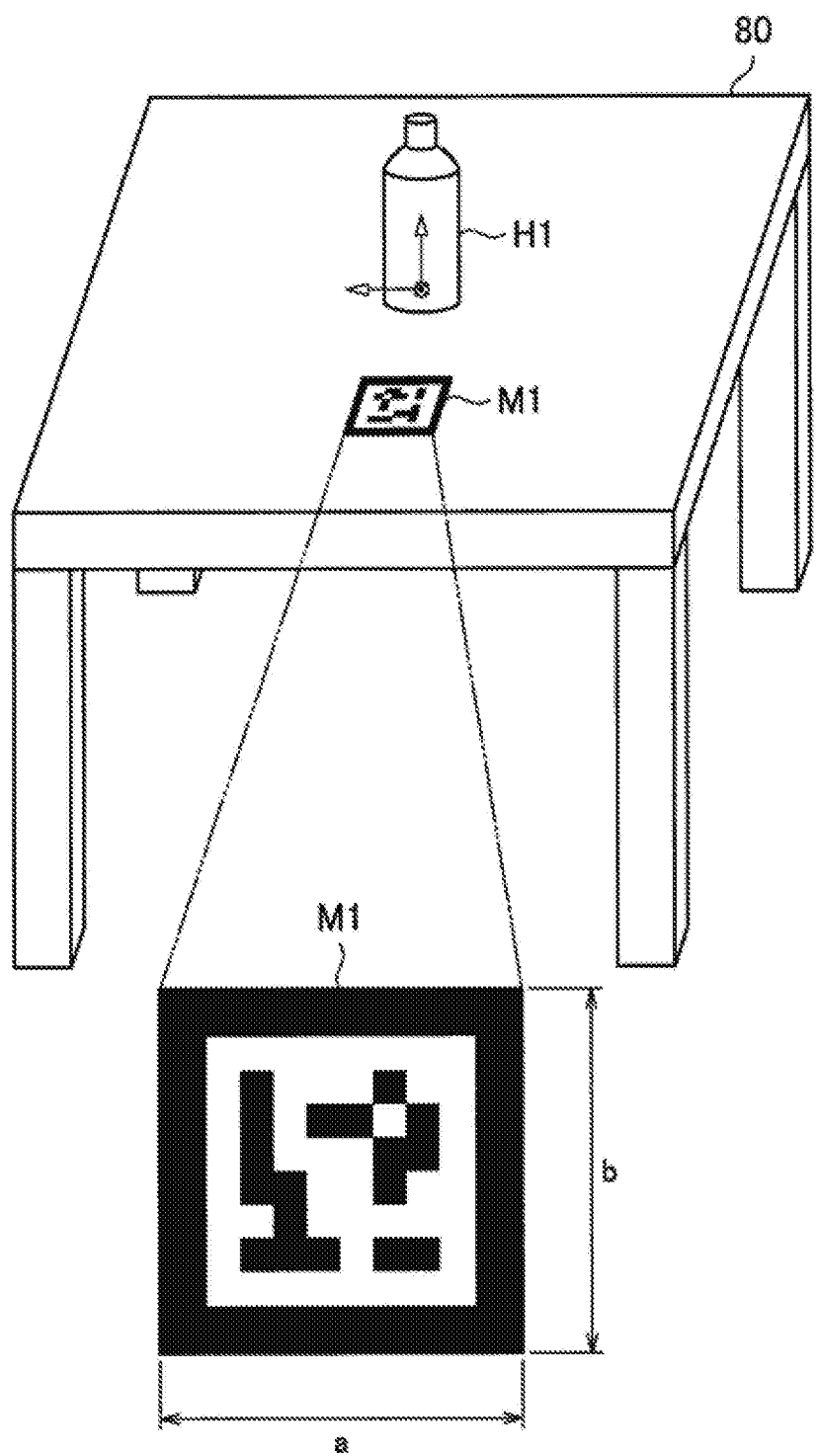

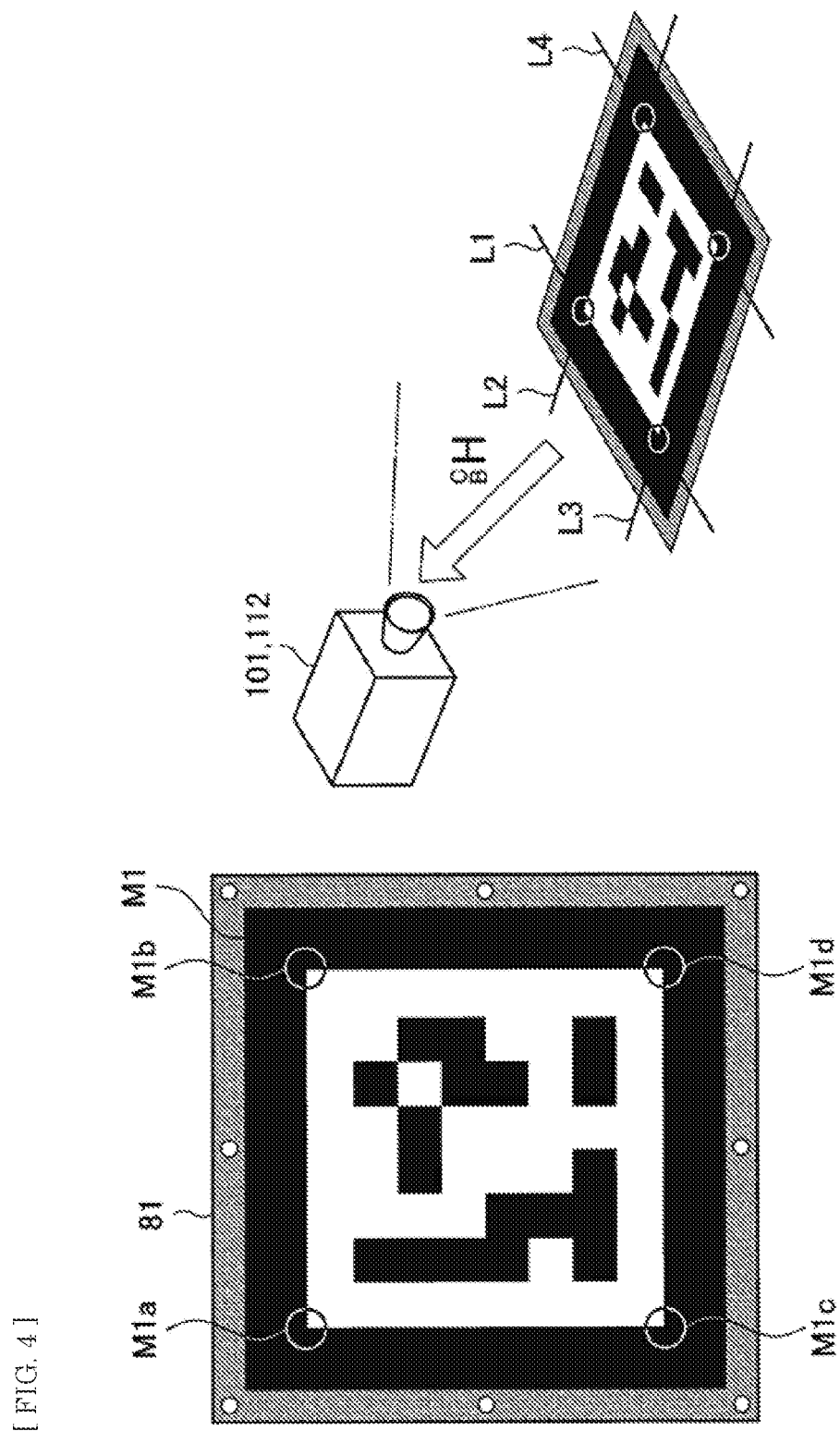

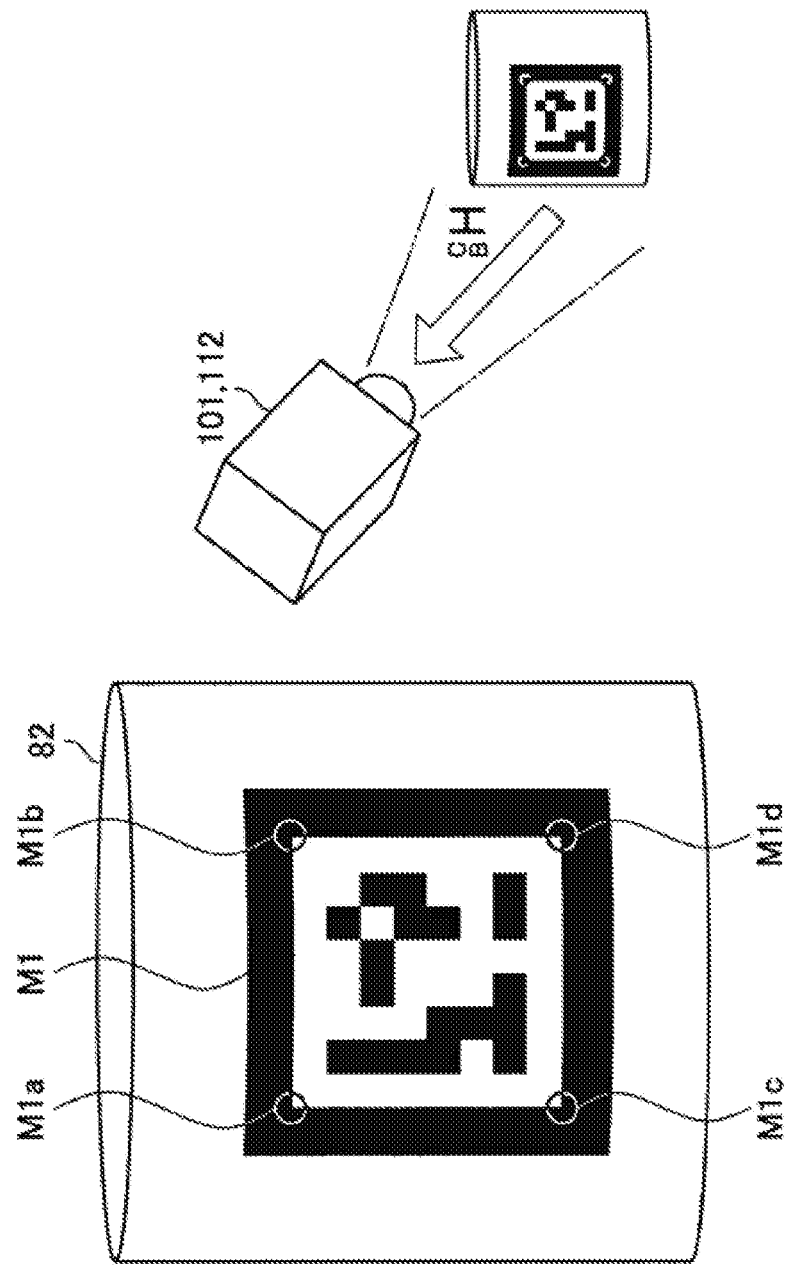
[FIG. 5]

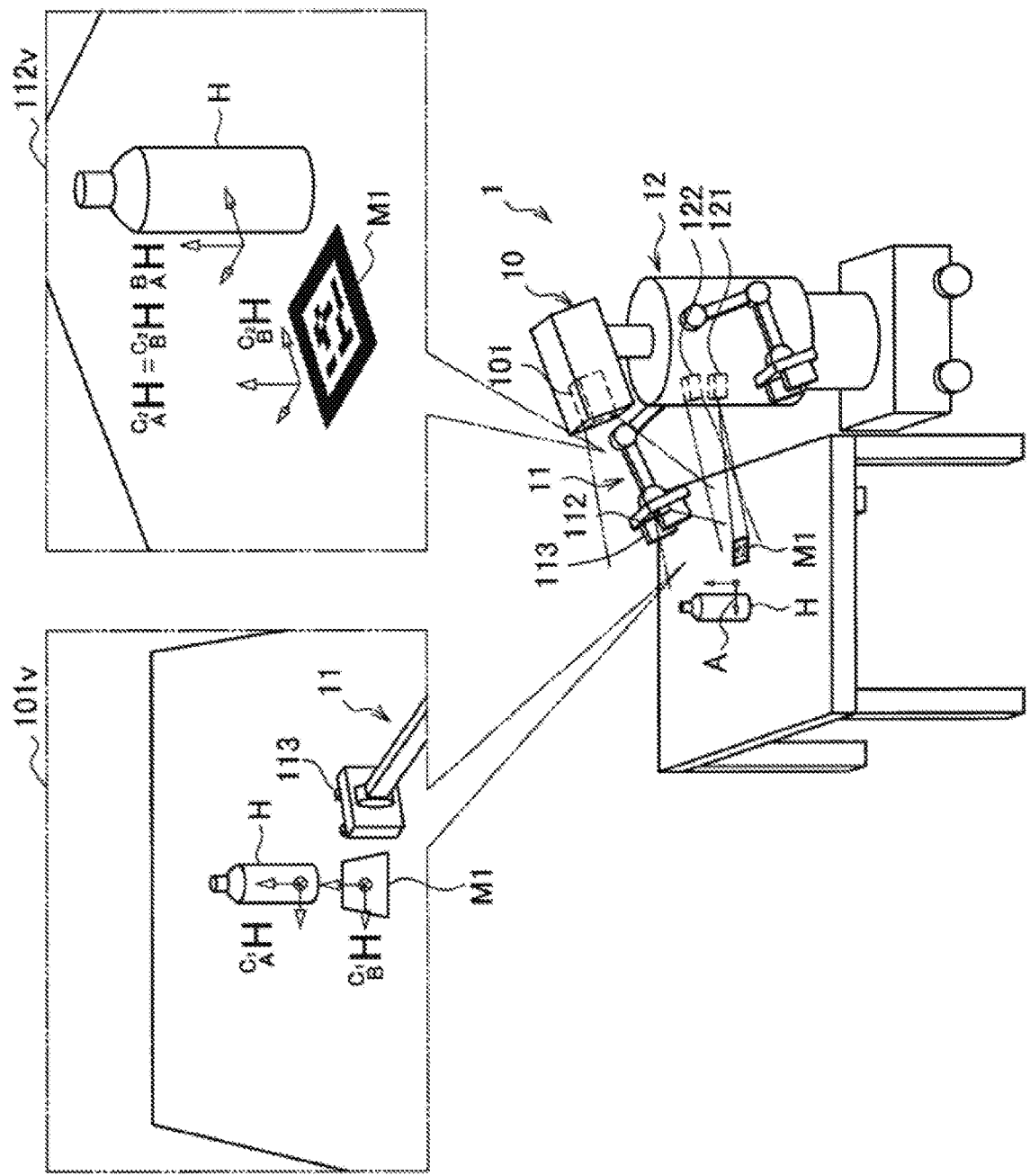
[FIG. 6]

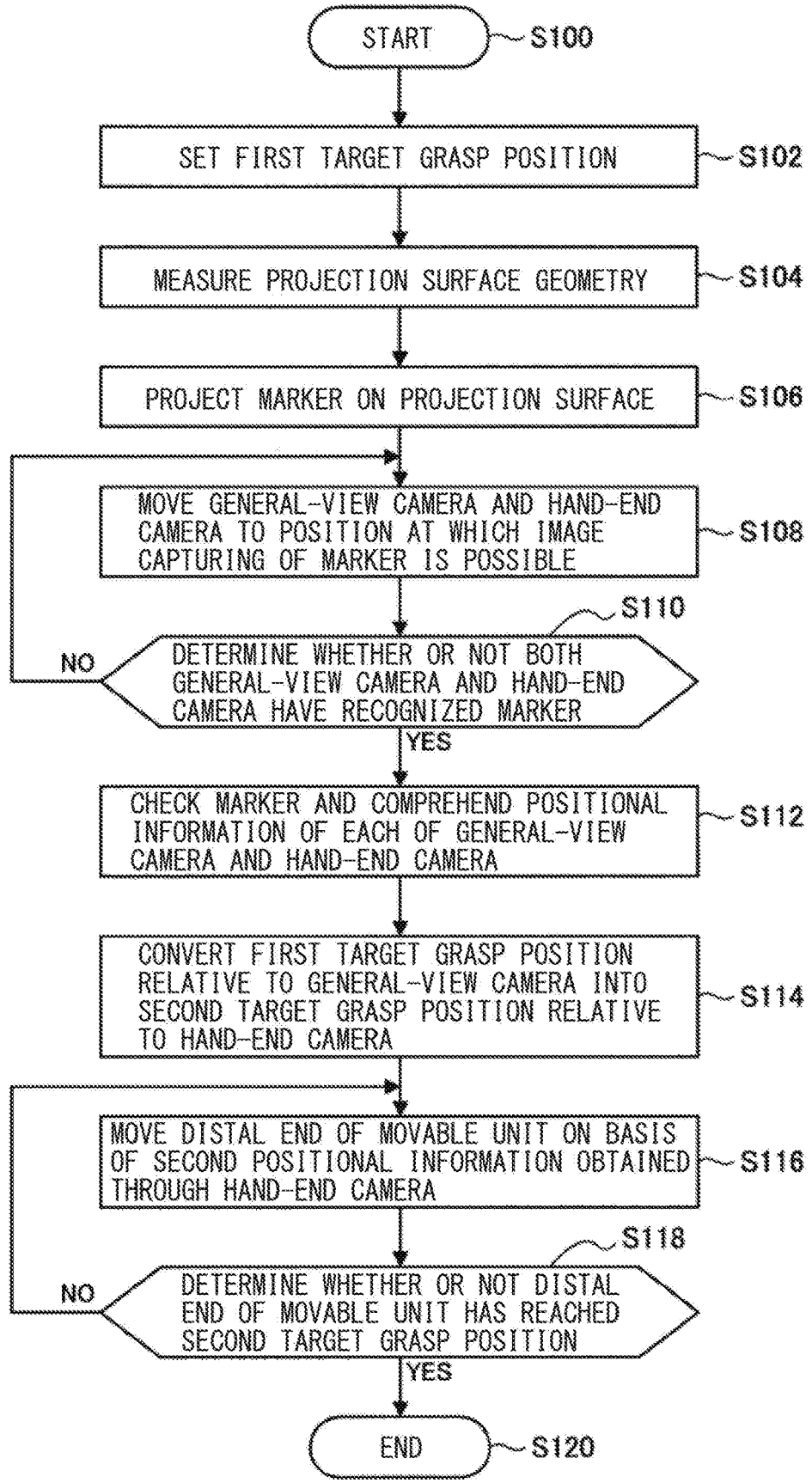
[FIG. 7]

INFORMATION PROCESSING APPARATUS, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2018/040276 (filed on Oct. 30, 2018) under 35 U.S.C. § 371, which claims priority to Japanese Patent Application No. 2018-008846 (filed on Jan. 23, 2018), which are all hereby incorporated by reference in their entirety.

TECHNICAL FIELD

The present disclosure relates to an information processing apparatus, an information processing method, and an information processing system.

BACKGROUND ART

Prior Patent Literature 1 below describes a technique of allowing a visual sensor to constantly capture an image of a movable unit and performing computational processing using a three-dimensional shape or texture data of the movable unit to estimate the position of the movable unit.

CITATION LIST

Patent Literature

PTL 1: Japanese Unexamined Patent Application Publication No. 2007-319938

SUMMARY OF THE INVENTION

Problems to be Solved by the Invention

However, according to the method described in PTL 1, when estimating the position of a distal end of the movable unit, a high load is involved in computationally processing data obtained through a first visual sensor and also, when the movable unit moves, the visual sensor has to continuously capture the image of the movable unit.

In view of the foregoing circumstances, it is desired to estimate the position of the distal end of the movable unit with a reduced processing load.

Means for Solving the Problems

According to the present disclosure, there is provided an information processing apparatus including a position computer that computes, on the basis of first positional information obtained from reading of a projected marker by a first visual sensor and second positional information including positional information obtained from reading of the marker by a second visual sensor that moves relative to the first visual sensor, a position of a movable unit in which the second visual sensor is disposed.

Further, according to the present disclosure, there is provided an information processing method including, on the basis of first positional information obtained from reading of a projected marker by a first visual sensor and second positional information including positional information obtained from reading of the marker by a second visual sensor that moves relative to the first visual sensor, computing a position of a movable unit in which the second visual sensor is disposed.

Further, according to the present disclosure, there is provided an information processing system including: a position computer that computes, on the basis of first positional information obtained from reading of a projected marker by a first visual sensor and second positional information including positional information obtained from reading of the marker by a second visual sensor that moves relative to the first visual sensor, a spatial position of a movable unit in which the second visual sensor is disposed; a projector that projects the marker; and the movable unit that is provided with the second visual sensor and that moves.

According to the present disclosure, each of the first visual sensor and the second visual sensor reads the marker, thereby making it possible to comprehend positional information of each of the first visual sensor and the second visual sensor relative to the marker, and to compute the position of the movable unit in which the second visual sensor is provided.

Effects of Invention

As described above, according to the present disclosure, it is possible to compute the position of the distal end of the movable unit with a reduced processing load.

Note that the effect described above is not necessarily limiting, and along with or instead of the above-described effect, any effect that is illustrated in the present specification or other effects that may be expected from the present specification may be exhibited.

BRIEF DESCRIPTION OF DRAWING

FIG. 1 is a diagram illustrating an external configuration according to one embodiment of the present disclosure.

FIG. 2 is a block diagram illustrating an internal configuration according to the embodiment.

FIG. 3 is an example in which a marker according to the embodiment is projected.

FIG. 4 is an example of the marker according to the embodiment.

FIG. 5 is an example of the marker according to the embodiment.

FIG. 6 is a diagram illustrating a state of a predetermined space where there are a robot of the embodiment and a target to be grasped.

FIG. 7 is a diagram illustrating an example of a flow of an operation according to the embodiment.

MODES FOR CARRYING OUT THE INVENTION

Hereinafter, a preferred embodiment of the present disclosure will be described in detail with reference to the accompanying drawings. In the present specification and the drawings, components that have substantially the same functions and configurations are denoted with the same reference signs, and repeated descriptions are omitted.

It should be noted that the description is given in the following order.

1. Embodiment
   1.1. Technical Overview and External Configuration
   1.2 Internal Configuration
   1.3. Flow of Processing
2. Modification Example 1. Embodiment <1.1. Technical Overview and External Configuration>

First, a technical overview and an external configuration according to an embodiment of the present disclosure will be described with reference to FIG. 1. FIG. 1 is a diagram illustrating a robot 1 to which an information processing system according to the embodiment of the present disclosure is applied.

In the present embodiment, the robot 1 may be a machine (apparatus) that is able to control movement of a movable unit 11 through electrical and/or magnetic workings. For example, the robot 1 may be, but not limited to, a humanoid autonomous robot, a quadrupedal robot, a self-driving car, a drone, an industrial robot (for example, an assembling robot for, e.g., machines), a service robot (for example, a medical robot such as a surgical robot, and a cooking robot), or a toy. Hereinafter, the technical overview and the external configuration will be described focusing on an example in which the robot 1 is a humanoid autonomous robot, and taking a case in which the robot 1 grasps an object H1 as an example.

(Technical Overview)

The technology of the present disclosure is applicable when the robot 1, in grasping an object, is to accurately compute the position of a distal end of a movable unit with which the object is to be grasped, in order to grasp the object at a prespecified target grasp position at which the object is to be grasped. Accurately computing the position of the distal end of the movable unit allows the robot 1 to grasp the object at the target grasp position with higher accuracy. At that time, the robot 1 reads a projected marker using various sensors provided for the robot 1 to compute the position of the distal end of the movable unit. This makes it possible to reduce a computational load in computing the position. Note that the target grasp position at which an object is to be grasped refers to a position imparted by a user or the autonomous function of the robot 1 and regarded as a proper position of the distal end of the movable unit when the robot 1 grasps the object.

In the present embodiment, description is given of an example in which the robot 1 includes, as various sensors, a first visual sensor, a second visual sensor, and a projection surface geometry sensor, all of which are imaging devices. Hereinafter, the first visual sensor is referred to as a general-view camera, and the second visual sensor is referred to as a hand-end camera. First, the external configuration of the robot 1 will be described.

(External Configuration)

The robot (moving body) 1 is a robot including a head unit 10, a movable unit 11, a body unit 12, and a moving unit 13. The head unit 10 is joined to the body unit 12 via a neck unit 102. In this case, the neck unit 102 may be rotatable around a predetermined rotation axis relative to the body unit 12. In addition, the head unit 10 may be rotatable relative to the neck unit 102, or may be fixed to the neck unit 102. Further, the head unit 10 is provided with a general-view camera 101 that reads a marker M1.

The movable unit 11 may be joined to the body unit 12. The movable unit 11 moves to grasp the object H1. The movable unit 11 may be disposed at one side, or both sides, of the body unit 12 of the robot 1. Moreover, a plurality of the movable units 11 may be provided for the robot 1.

The movable unit 11 may be configured to have, for example, a serial link structure. As illustrated in FIG. 1, the movable unit 11 may include at least one joint 111 between an end effector 113 and a junction between the body unit 12 and the movable unit 11. Such a structure of the movable unit 11 allows the movable unit 11 to have a plurality of degrees of freedom. The joint 111 is provided with an actuator that drives the joint 111 and an encoder that detects the angular position of the joint 111.

The movable unit 11 includes the end effector 113 at a distal end of the movable unit 11. The end effector 113 may be configured to be able to grasp the object H1. For example, the end effector 113 may include a plurality of fingers to grasp the object H1 by bending the plurality of fingers, or may include, as illustrated in FIG. 1, a pair of plate-shaped end effectors 113 to grasp the object H1 by narrowing the distance between the pair of the plates.

A hand-end camera 112 may be disposed near the end effector 113 provided at the distal end of the movable unit 11. As with the general-view camera 101, the hand-end camera 112 has a function of reading the marker M1. In the present embodiment, the hand-end camera 112 is disposed at or near the end effector 113 provided at the distal end of the movable unit 11. However, as long as it is known where the hand-end camera 112 is disposed in the movable unit 11, the position of the hand-end camera 112 is not limited to the above example, and furthermore, where to perform computation of the position of the movable unit is not limited to the distal end of the movable unit. Note that it is sufficient that the hand-end camera 112 is disposed at a location in the movable unit 11 at which it is desired to perform position computation.

In the robot 1 illustrated in FIG. 1, in order to accurately grasp the object H1, the hand-end camera 112 is provided near the end effector 113 that grasps the object H1. This configuration enables computation of the position where the end effector 113 is disposed. In particular, in a case where the hand-end camera 112 is provided near the end effector 113 as with the present embodiment, it is possible to perform position computation for the end effector 113 without making allowance for, e.g., a machine error regarding the angle or position of the joint 111 or deflection of the movable unit 11 that occurs when the movable unit 11 moves. This allows the position computation to be higher in accuracy.

The body unit 12 joins with the head unit 10, the movable unit 11, and the moving unit 13. The body unit 12 is provided with a projector 121, the projector 121 having a function of projecting the marker M1. Further, the body unit 12 is provided with a projection surface geometry measuring sensor 122, which enables measurement of a geometry of a surface on which the marker M1 is projected. Referring to FIG. 1, for example, the projection surface geometry measuring sensor 122 measures a geometry of a surface of a table 80 on which the marker M1 is projected.

The moving unit 13 is joined to the body unit 12, and has a function of supporting the head unit 10, the movable unit 11, and the body unit 12 described above. As illustrated in FIG. 1, the moving unit 13 may include, for example, a plurality of wheels 131. However, the moving unit 13 is not limited to such an example, and may include a plurality of legs (for example, two or four legs) for walking or an endless track mechanism such as Caterpillar (a registered trademark).

Using the above configuration, the robot 1 allows the general-view camera 101 and the hand-end camera 112 to read the marker M1 projected by the projector 121, thereby making it possible to compute, with high accuracy, the position of the distal end of the movable unit 11 at which the hand-end camera 112 is provided, and to thereby accurately grasp the object H1 at a prespecified target grasp position.

Moreover, to compute the position of the distal end of the movable unit 11 with high accuracy, the technology of the present disclosure uses a method of computation via the marker M1. This makes it possible to reduce the computational load that the computation involves.

For example, as a method for computing the position of the distal end of the movable unit without any marker, a method is conceivable in which the shape, etc. of each of the object and the movable unit is obtained using a general-view camera that is able to overview the entire robot and object, and then the obtained data and already-possessed shape data of the movable unit or the object are checked against each other or subjected to image analysis to thereby compute the position of the distal end of the movable unit. In this method, the computational load for the image analysis is higher than the computational load in the technology of the present disclosure.

The technology of the present disclosure enables computation of the position of the distal end of the movable unit 11 via the marker M1, thus making it unnecessary to possess shape data of the object H1 in advance. Accordingly, even if the object H1 is an unknown object, it is possible for the robot 1 to accurately grasp the object H1.

Further, in the technology of the present disclosure, respective positions of the marker M1, the object H1, the general-view camera 101, and the hand-end camera 112 are comprehended using the general-view camera 101 and the hand-end camera 112, and their positional relationship is comprehended. Once the positional relationship has been comprehended, the robot 1 is able to grasp the object H1 by moving the movable unit 11 using only information obtained through the hand-end camera 112. This makes it unnecessary for the robot 1 to continuously use the general-view camera 101, thereby enabling reduction in the operational load of the robot 1.

In the robot 1, the general-view camera 101 is provided in the head unit 10 of the robot 1, and the projector 121 and the projection surface geometry measuring sensor 122 are provided in the body unit 12 of the robot 1. The position of the general-view camera 101 is not limited to such an example, and the general-view camera 101 does not have to be provided in the robot 1 but may be installed in any location as long as it is able to see the marker M1 and the hand-end camera 112 and the position of the general-view camera 101 is clear. In this way, in the case where each component is provided in a location other than in the robot 1, the robot 1 may operate as an information processing system.

For example, the general-view camera 101, the projector 121, and the projection surface geometry measuring sensor 122 may be installed in a location that overlooks the marker M1 projected and the movable unit 11, such as a ceiling in a predetermined space. It is to be noted that, although where to install the projection surface geometry measuring sensor 122 and the projector 121 are not limited, the mutual positional relationship has to be known. As long as the mutual positional relationship is known, the projection surface geometry measuring sensor 122 and the projector 121 may each be provided in the robot 1 or in a location other than in the robot 1.

<1.2. Internal Configuration>

In the foregoing description, the technical overview and external configuration of the present disclosure have been described. Description is given here of an internal configuration of the robot 1 according to the present embodiment with reference to FIG. 2. FIG. 2 is a block diagram illustrating the internal configuration of the robot 1.

(Head Unit 10)

The head unit 10 includes the general-view camera 101 and an actuator 109. The actuator 109 has a function of making mechanical movements for allowing the robot 1 to move the head unit 10. The general-view camera 101 reads a projected marker M1, and obtains information about the marker M1. The information about the marker M1 is processed in a control unit 14. As a result, the robot 1 has a function of obtaining first positional information. The general-view camera 101 will be described in detail below.

((General-View Camera 101))

The general-view camera 101 has a function of reading the projected marker M1 and outputting marker information to the control unit 14. The control unit 14 processes the marker information that has been read by the general-view camera 101, thereby obtaining the first positional information. The first positional information may be information including a positional relationship between, or pose information about, the marker M1 and the general-view camera 101 in a space. A first positional relationship may be information indicating the position at which the general-view camera 101 is disposed relative to the position of the marker M1, or may be information indicating a distance or direction from the marker M1 to the general-view camera 101. The first positional information may include three-dimensional spatial coordinates of the general-view camera 101 relative to the marker M1 in the space. In addition, the first positional information may be represented as, for example, coordinates (x, y, z). The first pose information may be, e.g., information about a rotational angle of the first visual sensor relative to the marker, and may include information about a rotational angle that indicates how much the general-view camera 101 is rotating around an X axis, a Y axis, and a Z axis in a three-dimensional space (for example, a roll angle, a pitch angle, and a yaw angle). Further, the first pose information may be represented as a rotation matrix or quaternion.

For example, the general-view camera 101 in the present embodiment is an imaging apparatus intended to read the marker M1. The image captured by the imaging apparatus is processed at the control unit 14, thereby making it possible for the robot 1 to obtain the first positional information. The general-view camera 101 may capture a plurality of images of the marker M1 to read the marker M1.

For example, the general-view camera 101 may be an RGB camera, a thermography camera or the like to capture an image (a still image or moving image), and may include a lens system, a driving system, and an imaging device. The control unit 14 processes the image captured by the general-view camera 101 to allow the first positional information to be obtained.

Further, the general-view camera 101 may see the hand-end camera 112 in addition to the projected marker M1 to thereby allow the control unit 14 to obtain the positional information of the hand-end camera. The general-view camera 101 sees the position of the object H1 and the position of the marker M1 in addition to the hand-end camera 112. Here, the general-view camera 101 obtains, in addition to the above described first positional information, positional information of the hand-end camera 112, thereby making it possible to comprehend the positions of the hand-end camera 112, the object H1, and the marker M1 relative to the general-view camera 101.

In the above-described manner, the control unit 14 is able to comprehend positional information, positional relationship, or pose information of the object H1, the marker M1, the general-view a 101, and the hand-end camera 112 relative to the general-view camera 101. The positional relationship may indicate, e.g., positions of, or distances or directions between, the object H1, the marker M1, the general-view camera 101, and the hand-end camera 112 in a predetermined space, and the pose information may indicate pose information relating to the respective rotational angles thereof. It is to be noted that the target grasp position at which the object H1 is to be grasped is prespecified, by a user or the autonomic function of the robot 1, relative to the general-view camera 101.

Accordingly, use of the positional information, the positional relationship or pose information enables conversion of a first target grasp position relative to the general-view camera 101 into a second target grasp position relative to the hand-end camera 112. Details of the conversion of the target grasp position will be described later.

(Movable Unit 11)

Next, the movable unit 11 will be described. The movable unit 11 is controlled by a movable controller 147. The movable unit 11 includes the end effector 113, the hand-end camera 112, and an actuator 119. The actuator 119 has a function of making mechanical movements for allowing the robot 1 to move the movable unit 11. As has been described under the external configuration section, the end effector 113 is disposed at the distal end of the movable unit 11 and has a function of grasping an object. Hereinafter, the hand-end camera 112 will be described in detail.

((Hand-End Camera 112))

The hand-end camera 112 is provided in the movable unit 11, and has a function of reading the marker M1 and outputting marker information to the control unit 14. The control unit 14 processes the marker information that has been read by the hand-end camera 112, thereby obtaining second positional information. The second positional information may be information including a positional relationship between, or pose information about, the marker M1 and the hand-end camera 112 in a space. The second positional relationship may indicate the position at which the hand-end camera 112 is disposed relative to the position of the marker M1, or may be information indicating a distance or direction from the marker M1 to the hand-end camera 112. The second positional information may include three-dimensional spatial coordinates of the hand-end camera 112 relative to the marker M1 in the space. In addition, the second positional information may be represented as, for example, coordinates (x, y, z). The second pose information may be, e.g., information about a rotational angle of the second visual sensor relative to the marker, and may include information about a rotational angle that indicates how much the hand-end camera 112 is rotating around an X axis, a Y axis, and a Z axis in the three-dimensional space (for example, a roll angle, a pitch angle, and a yaw angle). Further, the second pose information may be represented as a rotation matrix or quaternion.

The second positional information may include positional information of the hand-end camera 112. The positional information of the hand-end camera 112 may indicate the position of the hand-end camera 112 relative to the general-view camera 101, and may be information indicating a distance or direction between the general-view camera 101 and the hand-end camera 112. The second positional information may include three-dimensional spatial coordinates of the hand-end camera 112 relative to the general-view camera 101 in the space. In addition, the second positional information may be represented as, for example, coordinates (x, y, z).

For example, as with the general-view camera 101, the hand-end camera 112 in the present embodiment is an imaging device to read the marker M1. The control unit 14 may process the image captured by the imaging device to obtain the second positional information. As with the general-view camera 101, the hand-end camera 112 may capture a plurality of images of the marker M1 to read the marker M1.

For example, as with the general-view camera 101, the hand-end camera 112 may be an RGB camera, a thermography camera or the like to capture an image (a still image or moving image), and may include a lens system, a driving system, and an imaging device. The control unit 14 performs image processing on the image captured by the camera of the hand-end camera 112 to obtain the second positional information.

(Body Unit 12)

The body unit 12 includes the projection surface geometry measuring sensor 122, the projector 121, and an actuator 129. The actuator 129 has a function of making mechanical movements for allowing the robot 1 to move the body unit 12. Hereinafter, the projector 121 and the projection surface geometry measuring sensor 122 will be described.

((Projection Surface Geometry Measuring Sensor 122))

The projection surface geometry measuring sensor 122 has a function of measuring the geometry of the surface on which the marker M1 is to be projected. The geometry of the projection surface may be a flat surface or any curved surface such as a spherical surface, and the projection surface geometry measuring sensor 122 obtains geometry information of such projection surfaces. The geometry information of the projection surface includes information about irregularities or texture on the projection surface.

The projection surface geometry measuring sensor 122 may be an imaging apparatus such as a camera. For example, the projection surface geometry measuring sensor 122 may be an imaging apparatus to capture an image (a still image or moving image), such as an RGB camera or a thermography camera, and may include a lens system, a driving system, and an imaging device. The projection surface geometry measuring sensor 122 may carry out image analysis of the image captured by the camera to comprehend the geometry of the surface on which the marker M1 is to be projected.

Further, the projection surface geometry measuring sensor 122 may include a sensor that obtains depth information in a space, such as a depth sensor. For example, the depth sensor may include, e.g., an infrared ranging device, an ultrasonic ranging device, an LiDAR (Laser Imaging Detection and Ranging) or a stereo camera, thereby obtaining depth information of the projection surface and comprehending the geometry of the surface on which the marker M1 is to be projected. The projection surface geometry measuring sensor 122 may obtain depth information of the projection surface using a ToF (Time of Flight) method.

((Projector 121))

The projector 121 has a function of projecting the marker M1. The projector 121 may be, for example, a fixed wide-angle projector or a so-called moving projector that is able to change the projection direction.

(Moving Unit 13)

The moving unit 13 has a function of moving as a support when the robot 1 moves. The moving unit 13 includes a sensor 132 and an actuator 139. The actuator 139 has a function of making mechanical movements for allowing the robot 1 to move the moving unit 13.

The sensor 132 carries out various sensing processes regarding the moving unit 13. The sensor 132 may include, for example, an acceleration sensor, a gyroscope, a temperature sensor, a torque sensor, a weight sensor, a camera, and/or a microphone, etc. According to the information obtained through the sensor 132, the moving unit 13 may determine its moving direction or position.

(Control Unit 14)

Next, a detailed description will be given of the control unit 14 that controls various components of the robot 1 that mainly serve when the robot 1 grasps the object H1.

The control unit 14 has a function of exercising overall control over respective components included in the head unit 10, the movable unit 11, the body unit 12, and the moving unit 13. Hereinafter, components included in the control unit 14 will be described.

((Projection Marker Controller 143))

A projection marker controller 143 has a function of controlling the marker M1 that is to be projected by the projector 121. The control ling of the marker M1 includes a function of creating the marker M1 and changing the projection position of the marker M1.

The projection marker controller 143 creates the marker M1. The projection marker controller 143 may create a marker M1 having a symbol or texture pattern that allows detection of characteristics of the image such as a point, a line, or a planar structure. The marker M1 is not limited to such an example, and may be created in any shape. This allows the control unit 14 to compute the position of the distal end of the movable unit 11 using various markers, leading to improvement of convenience of the robot 1. The marker M1 may include visible light, infrared light, and ultraviolet light, and may emit light that the general-view camera 101 and the hand-end camera 112 are able to detect. The projection marker controller 143 may allow a storage unit 15 to store marker information, such as an image characteristic with which the created marker M1 is created and a position from which the marker M1 is projected, as reference marker information.

The marker M1 will further be described with reference to FIG. 3. FIG. 3 illustrates one example of the marker M1 projected. In FIG. 3, the table 80 is provided in a predetermined space, and the object H1 is disposed on the table 80. The marker M1 is projected in the vicinity of the object H1. In FIG. 3, only one marker M1 is projected. Alternatively, the projection marker controller 143 may create and project a plurality of markers M1.

Projecting a plurality of markers M1 by the projection marker controller 143 makes it possible that, even if a portion of a marker M1 is affected, such as being shielded, the general-view camera 101 and the hand-end camera 112 capture an image of any other marker M1 that is not shielded, thereby reading the marker M1.

FIG. 3 illustrates an augmented reality (AR) marker as one example of the marker M1. The marker M1 has a square shape, and has predetermined lengths, namely, a horizontal length a and a vertical length b. The length a of one side and the length b of another side are the same. The marker M1 has a white region surrounded by a black frame, and in the white region, e.g., a point, a line, or a planar structure may be drawn.

The projection marker controller 143 may have a function of controlling the position in which the marker M1 is to be projected. The projection position of the marker M1 is not limited as long as it is possible to measure the projection surface geometry. For example, in a case where the robot 1 grasps the object H1, reading the mark M1 makes it possible to compute the position of the distal end of the movable unit 11. Therefore, the closer the marker M1 is to the object H1, the greater the extent to which a machine error including deflection of the movable unit 11 or the like relative to the target grasp position is reducible. Thus, the marker M1 may be projected on the vicinity of the object H1 or on the object H1.

Moreover, the projection marker controller 143 may exercise control to change the projection position of the marker M1 according to the range of vision of each of the general-view camera 101 and the hand-end camera 112. For example, in a case where the marker M1 projected is not within the range of vision in which sensing is possible by the general-view camera 101 and the hand-end camera 112, the projection marker controller 143 may change the projection position of the marker M1 to be within the range of vision in which sensing is possible by the general-view camera 101 and the hand-end camera 112.

This makes it possible to change the projection position of the marker M1 according to the condition of the robot 1 and the surrounding environment of the robot 1, thereby enabling improvement of convenience. The surrounding environment may be, for example, an environment of a projection surface when an AR marker is projected. In a case where the projection surface has high luminance, the general-view camera 101 and the hand-end camera 112 have difficulty in reading an AR marker. Under such an environment, the projection marker controller 143 may project the AR marker on a place having low luminance. It should be noted that, if the projection position of the marker M1 is changed, the first positional information and the second positional information are obtained again through the general-view camera 101 and the hand-end camera 112.

((Position Computer 141))

A position computer 141 has a function of, on the basis of the geometry information obtained through the projection surface geometry measuring sensor 122, checking the marker information obtained through the general-view camera 101 and the hand-end camera 112 against reference marker information that is possessed in advance and computing the positions of the general-view camera 101 and the hand-end camera 112. The reference marker information is information about the marker M1 stored in the storage unit 15 when the projection marker controller 143 creates and projects the marker M1. For example, in a case where the marker M1 is an AR marker, the reference marker M1 information includes information about vertical and horizontal lengths of the marker M1, the profile of the marker M1, and a point, a line, or a planar structure that are drawn in the white region of the marker M1.

By using the geometry information obtained through the projection surface geometry measuring sensor 122, the position of the projector, and the reference marker information, the position computer 141 is able to estimate in advance, according to the image-capturing position of the marker M1, what image will result from capturing, at any position, an image of the marker M1 projected from a certain position. By checking an actual image captured by each of the general-view camera 101 and the hand-end camera 112 against the image estimated in advance, it is possible to compute the positions of the general-view camera 101 and the hand-end camera 112.

An example in which the position computer 141 checks the marker M1 against the reference marker information will be described with reference to FIGS. 4 and 5. As described above, the marker M1 may be a symbol or texture pattern whose image characteristics, such as a point, a line, or a planar structure, in a white region surrounded by a black frame are easily detectable. On the basis of the information obtained through the general-view camera 101 and the hand-end camera 112, the position computer 141 detects image characteristics, such as a point, a line, or a planar structure, and obtains a plurality of correspondence relationships between real three-dimensional spatial coordinates and two-dimensional coordinates of the captured image. This makes it possible to obtain the positional information, positional relationship, or pose information of the general-view camera 101 and the hand-end camera 112 relative to the marker M1. For example, it is possible to obtain, specifically, positional information including spatial coordinates or pose information that is information regarding the rotational angles of the general-view camera 101 and the hand-end camera 112 relative to the marker.

FIG. 4 illustrates one example of the marker M1 projected on a plane 81. First, on the basis of the geometry information obtained through the projection surface geometry measuring sensor 122, the position computer 141 recognizes that the place on which the marker M1 is projected is a plane. On the premise that the marker M1 is projected on the same plane, the position computer 141 detects a point or line of the square of the marker M1 or a planer structure in a white region in the marker M1. The detection result is checked against the reference marker information to thereby compute the positions of the general-view camera 101 and the hand-end camera 112. Note that, at that time, the position gat which the projector 121 is disposed is known. As a result, the position computer 141 comprehends the direction from which the projector 121 projects the marker M1, and thus, the above checking makes it possible to compute the position on the basis of the direction or position of the projector 121.

In the position computation, for example, profile lines L1, L2, L3, and L4 surrounding the marker M1 are detected, and then, from points of intersection of the profile lines, four corners of the square, i.e., M1a, M1b, M1c, and M1d are extracted. Thereafter, the sides are extended in the projection direction of the general-view camera 101 and of the hand-end camera 112 to create a surface, and a normal line to the surface is computed. Information regarding the surface obtained here, including a point, a line, or a planar structure in a white region, and the normal line information of the surface for the marker M1 are checked against information regarding the surface including a point, a line, or a planar structure in a white region and normal line information of the surface in the reference marker information. On the basis of the match rate, the positions from which the general-view camera 101 and the hand-end camera 112 are capturing the images of the marker M1 are estimated, and the positions of the general-view camera 101 and of the hand-end camera 112 are computed.

FIG. 5 illustrates one example of the marker M1 projected on a column 82. First, on the basis of the geometry information obtained through the projection surface geometry measuring sensor 122, the position computer 141 recognizes that the place on which the marker M1 is projected is a column having a spherical surface. The position computer 141 estimates in advance a distortion that might occur in the marker M1, for example, in what shape the marker will be as projected on the column 82. On the premise that the marker M1 is projected on the column, the position computer 141, detects a point or line of the square of the marker M1 or a planer structure in a white region in the marker M1 in consideration of the distortion estimated in advance. The detection result is checked against the reference marker information to thereby compute the positions of the general-view camera 101 and the hand-end camera 112.

In the position computation, as with FIG. 4, for example, the profile lines surrounding the marker M1 are detected and thereafter, four corners of the square, i.e., M1a, M1b, M1c, and M1d are extracted from points of intersection of the profile lines. Then, the sides are extended in the projection direction of the general-view camera 101 and of the hand-end camera 112 to create a surface, and a normal line to the surface is computed. Information regarding the surface obtained here, including a point, a line, or a planar structure in a white region and the normal line information of the surface for the marker M1 are checked against the information regarding the surface including a point, a line, or a planar structure in a white region and normal line information of the surface in the reference marker information. On the basis of the match rate, the positions from which the general-view camera 101 and the hand-end camera 112 are capturing the images of the marker M1 are estimated, and the positions of the general-view camera 101 and of the hand-end camera 112 are computed.

On the basis of the result of the position computation, the position computer 141 further comprehends the positional relationship between the movable unit 11 and a target moving position thereof to compute the position of the distal end of the movable unit 11, at which the hand-end camera 112 is disposed, relative to the target moving position. The computation of the position of the distal end of the movable unit 11, at which the hand-end camera 112 is disposed, relative to the target moving position is performed by the position computer 141 by using the information processed through a three-dimensional information integrator 145.

((Three-Dimensional Information Integrator 145))

The three-dimensional information integrator 145 has a function of, on the basis of the first positional information and the second positional information obtained through the general-view camera 101 and the hand-end camera 112, converting a first target moving position for the distal end of the movable unit specified relative to the general-view camera 101 into a second target moving position for the distal end of the movable unit relative to the hand-end camera 112. The converted information is outputted to the position computer 141, and is used for computation of the position of the distal end of the movable unit. The details of processing carried out by the three-dimensional information integrator 145 will be described with reference to FIG. 6. In the present embodiment, description is made with reference to one example in which the robot 1 grasps an object H, and thus the target moving position will also be referred to as a target grasp position.

FIG. 6 illustrates a predetermined space where there are the robot 1 and the object H, which is a target to be grasped. The head unit 10 of the robot 1 is provided with the general-view camera 101. The body unit 12 is provided with the movable unit 11, and the end effector 113 to grasp the object H is provided at the distal end of the movable unit 11. The hand-end camera 112 is provided near the end effector 113, and reads the marker M1. The projector 121 projects the marker M1 onto the vicinity of the object H. The upper portion of FIG. 6 illustrates a range 101v of vision of the general-view camera 101 and a range 102v of vision of the hand-end camera 112.

Using Expression (1) below, transformation processing of spatial coordinates in the three-dimensional information integrator 145 will be described. Expression (1) is a homogeneous transformation matrix representing spatial coordinates as viewed from a coordinate system X to a coordinate system Y. In addition, Expression (1) indicates a three-dimensional vector P regarding translational movement to the coordinate system Y as viewed from the coordinate system X, and a 3×3 rotation matrix R regarding rotational movement. This matrix may be used in transformation of the spatial coordinates in the three-dimensional information integrator 145, for example.

[Math. 1]
$$^X_Y H = \left( \begin{array}{ccc|c} & ^X_Y R & & ^X_Y p \\ \hline 0 & 0 & 0 & 1 \end{array} \right) \quad (1)$$

When the robot 1 grasps the object the first target grasp position relative to the general-view camera 101 is set in advance by a user or the autonomic function of the robot 1. This setting determines Expression (2), which is a homogeneous transformation matrix representing spatial coordinates of a coordinate system A of the first target grasp position as viewed from a coordinate system C1 of the general-view camera 101.

Next, the general-view camera 101 reads the marker M1 to enables estimation of the position of the general-view camera 101. This estimation makes it possible to estimate spatial coordinates of the marker M1 relative to the general-view camera 101. This estimation further makes it possible to estimate Expression (3), which is a simultaneous transformation matrix representing spatial coordinates of a coordinate system B of the marker M1 as viewed from the coordinate system C1 of the general-view camera 101.

At that time, using Expression (4) representing inverse transformation of the simultaneous transformation matrix, it is possible to obtain spatial coordinates of the first target grasp position A as viewed from the coordinate system B of the marker M 1 from Expression (5).

Next, the hand-end camera 112 provided in the movable unit 11 reads the marker M1 to enable estimation of the position of the hand-end camera 112. This estimation makes it possible to estimate the space coordinates of the marker M1 relative to the hand-end camera 112. This estimation further makes it possible to estimate Expression (6), which is a simultaneous transformation matrix representing spatial coordinates of the coordinate system B of the marker M1 as viewed from a coordinate system C2 of the hand-end camera 112.

Using Expression (6) and Expression (5), it is possible to obtain, from Expression (7), a simultaneous transformation matrix representing spatial coordinates of the second target grasp position as viewed from the hand-end camera C2.

[Math. 2]
$$_A^{C1}H \quad (2)$$

[Math. 3]
$$_B^{C1}H \quad (3)$$

[Math. 4]
$$_{C1}^{B}H = _B^{C1}H^{-1} \quad (4)$$

[Math. 5]
$$_A^B H = _{C1}^B H _A^{C1} H \quad (5)$$

[Math. 6]
$$_B^{C2}H \quad (6)$$

[Math. 7]
$$_A^{C2}H = _B^{C2}H _A^B H \quad (7)$$

Using, e.g., the above-described method, the three-dimensional information integrator 145 may convert the first target moving position of the distal end of the movable unit 11 specified relative to the general-view camera 101 into the second target moving position of the distal end of the movable unit 11 relative to the hand-end camera 112. On the basis of the second target moving position, the position computer 141 computes the position of the distal end of the movable unit 11 relative to the target moving position.

In other words, the general-view camera 101 and the hand-end camera 112 capture images of the marker M1, and the control unit 14 carries out analytical processing on the images captured. This analytical processing allows each of the general-view camera 101 and the hand-end camera 112 to obtain its positional information, positional relationship, or pose information relative to the marker M1. Because the general-view camera 101 and the hand-end camera 112 capture the images of the same marker M1, it is possible to obtain a relative positional relationship between the general-view camera 101 and the hand-end camera 112. This makes it possible to convert the first target grasp position r dative to the general-view camera 101 into the second target grasp position relative to the hand-end camera 112, and allows the robot 1 to grasp an object using the positional information obtained from the hand-end camera 112. This enables reduction in the processing load of the control unit 14. In addition, this eliminates factors such as mechanical rattle and deflection of the joint 111, thereby allowing the robot 1 to move the end effector 113 at the distal end of the movable unit 11 to the object H with high accuracy.

((Mobility Controller 147))

A movable controller 147 has a function of controlling the movable unit 11. The movable controller 147 may compute the position of the movable unit 11 on the basis of the second target moving position and the second positional information that have been computed in accordance with the positional information obtained through the general-view camera 101 and the hand-end camera 112, and may control the position of the movable unit 11. Furthermore, with the general-view camera 101 seeing the hand-end camera 112 within its range of vision, the position of the distal end of the movable unit 11 may be controlled on the basis of the positional information of the hand-end camera 112 and the second target grasp position. For example, the general-view camera 101 may perform image capturing with the hand-end camera 112, the end effector 113 around the hand-end camera 112, or the movable unit 11 contained in the image being captured. As a result, by performing, e.g., image analysis on the captured image at the control section 14, the position of the movable unit 11 is computed with higher accuracy. Then, the movable unit 11 may be controlled to the target grasp position. The positional information of the hand-end camera 112 may be information including spatial coordinates or pose information indicating, e.g., where the movable unit 11 provided with the hand-end camera 112 is located, or may be information including spatial coordinates or pose information of the hand-end camera 112.

As described above, on the basis of the first and second positional information obtained through capturing of the marker M1 by the general-view camera 101 and the hand-end camera 112, the position computer 141 computes the position of the movable unit, and the movable controller 147 drives the actuator 119 while referring to the angular position of the encoder provided in the joint 111. This makes it possible to control the position of the distal end of the movable unit 11 as appropriate. Moreover, the general-view camera 101 sees the hand-end camera 112, and as a result, the position of the hand-end camera 112 relative to the general-view camera 101, including factors such as mechanical rattle, deflection of the joint 111 or the like, becomes known.

Accordingly, in a case where the general-view camera 101 sees the hand-end camera 112 within its range of vision, the position of the hand-end camera 112 relative to the general-view camera 101 becomes known, and thus it is possible to control the position of the distal end of the movable unit 11 on the basis of the mechanical shape of a link of the movable unit 11 and the angular position of the encoder provided in the joint 111. As a result, it is possible to reliably avoid a reduction in tracking accuracy for the target position due to mechanical rattle during movement. As described above, once the positional relationships among the general-view camera 101, the hand-end camera 112, the marker M1, and the first and second target grasp positions have been comprehended through the general-view camera 101, it is then possible for the movable controller 147 to allow the movable unit 11 to move with improved tracking accuracy to the target position on the basis of the hand-end camera 112 and the second target grasp position, without the general-view camera 101. In addition, this eliminates factors such as mechanical rattle, deflection of the joint 111, etc., and therefore it is possible for the robot 1 to move the end effector 113 at the distal end of the movable unit 11 to the position of the object H with high accuracy and with reduced processing load on the control unit 14.

The movable controller 147 may exercise control of movement to make it possible for the hand-end camera 112 provided in the movable unit 11 to continuously capture the image of the marker M1. For example, in a case where the hand-end camera 112 becomes unable to capture the image of the marker M1 due to a portion of the movable unit 11 being interposed between the projector 121 and the marker M1, the movable controller 147 may move the movable unit 11 off a position between the projector 121 and the marker M1. This makes it possible to move the movable unit 11 to the second target grasp position with increased accuracy because the longer the hand-end camera 112 continues to capture the image of the marker M1, the more accurately the position of the distal end of the movable unit 11 is computable.

(Storage Unit 15)

The storage unit 15 stores a program or a parameter to allow the above-described control unit 14 to carry out its functions. For example, the storage unit 15 stores the reference marker information created by the projection marker controller 43, various types of information such as the images captured by the general-view camera 101 and the hand-end camera 112, and various threshold values for use in processing the control unit 14.

(Communication Unit 16)

A communication unit 16 transmits and receives information to and from other parts via a network (for example, the Internet or any of various LANs (Local Area Networks)). For example, in a case where the general-view camera 101, the hand-end camera 112, and the projection surface geometry measuring sensor 122 are apart from the control unit 14, the communication unit 16 transmits information obtained through the sensors 101, 112, and 122 to the control unit 14.

Up to this point, the control unit 14, the storage unit 15, and the communication unit 16 have been described. It should be noted that the control unit 14 may be, e.g., a processor such as a central processing unit or a control board on which a processor and a storage device such as a memory are mounted, or may be a digital signal processor or hardware circuit. Furthermore, the control unit 14 may be a combination of the foregoing. Moreover, the control unit 14 may be an information processing apparatus for general purpose use, such as a personal computer. The processor in the control unit 14 executes arithmetic processing in accordance with a predetermined program, thereby making it possible to achieve various functions.

<1.3. Flow of Processing>

The internal configuration of the robot 1 has been described so far. Next, a description will be given of a flow of processing according to the present embodiment with reference to FIG. 7. FIG. 7 is a flowchart illustrating an example of the flow of processing according to the present embodiment.

First, pushing, e.g., a power supply button allows the robot 1 to start its operation (S100).

Next, in accordance with a predetermined operation method, the user sets a "first target grasp position", which is a position at which the object H1 is to be grasped relative to the general-view camera 101 (S102).

When setting the first target grasp position, the user may set it by, e.g., specifying an image captured by the general-view camera 101 by touching, for example. Alternatively, the robot 1 may set the "first target grasp position" using its autonomic function.

Next, the projection surface geometry measuring sensor 122 measures a projection surface geometry of the place on which the marker M1 is to be projected (S104). The control unit 14 processes the geometry information of the projection surface geometry obtained through the projection surface geometry measuring sensor 122, thereby allowing the position computer 141 to compute the position of each of the general-view camera 101 and the hand-end camera 112 via the marker M1.

At that time, the control unit 14 of the robot 1 allows the storage unit 15 to store the projection surface geometry obtained through the projection surface geometry measuring sensor 122.

Next, the projection marker controller 143 of the control unit 14 creates the marker M1 to be projected. The marker M1 created is projected by the projector 121 (S106).

Next, the robot 1 moves the general-view camera 101 and the hand-end camera 112 to a position at which reading of the marker M1 is possible (S108).

Next, the control unit 14 determines whether or not both the general-view camera 101 and the hand-end camera 112 have recognized the marker M1 (S110). In a case where it is determined that neither the general-view camera 101 nor the hand-end camera 112 has recognized the marker M1 (S110/No), the control unit 14 moves the general-view camera 101 and the hand-end camera 112 again to a position which both the general-view camera 101 and the hand-end camera 112 are able to recognize the marker M1.

In a case where it is determined that both the general-view a 101 and the hand-end camera 112 have recognized the marker M1 (S110/Yes), the robot 1 proceeds to the next process.

Next, the position computer 141 checks the first and second positional information obtained from the images of the marker M1 captured by the general-view camera 101 and the hand-end camera 112 and the geometry information of the projection surface geometry stored in the storage unit 15 against the reference marker information to comprehend the positional information, positional relationship, or pose information regarding the general-view camera 101 and the hand-end camera 112 (S112). The positional information may include three-dimensional spatial coordinates of the general-view camera 101 and of the hand-end camera 112 relative to the marker M1 in a space, and may be represented as, e.g., (x, y, z) coordinates. The positional relationship may indicate, for example, the positions of the general-view camera 101 and the hand-end camera 112 relative to the marker M1, or may be distances or directions to the positions at which the general-view camera 101 and the hand-end camera 112 are located relative to the marker M1. The pose information may include information about a rotational angle that indicates the degrees of rotation around respective axes, namely, an X axis, a Y axis, and a Z axis in a three-dimensional space (for example, a roll angle, a pitch angle, and a yaw angle). Further, the pose information may be represented as a rotation matrix or quaternion.

Next, the three-dimensional information integrator 145 converts the first target grasp position relative to the position of the general-view camera 101 into the second target grasp position relative to the hand-end camera 112 on the basis of the positional information, positional relationship, or pose information of the general-view camera 101 and the hand-end camera 112 relative to the marker M1, computed by the position computer 141.

Carrying out this conversion processing allows the robot 1 to grasp the object H1 more accurately by moving the movable unit 11 using the hand-end camera 112, which is closer to the object H1, without using image processing or the like based on the image captured by the general-view camera 101.

Next, on the basis of the second positional information and second target grasp position obtained through the hand-end camera 112, the robot 1 controls the distal end of the movable unit 11 (S116).

Next, the control unit 14 determines whether or not the distal end of the movable unit 11 has reached the second target grasp position (S118). In a case where it is determined that the distal end of the movable unit 11 has not reached the second target grasp position (S1118/No), the movable controller 147 moves the movable unit 11 again.

In a case where it is determined that the movable unit 11 has reached the second target grasp position (S118/Yes), the movable unit 11 grasps the object H1, and the robot 1 ends its operation (S120).

2. Modification Example

In the present embodiment, a technique of computing the position of the distal end of the movable unit 11 in a case where the robot 1 grasps the object H1 has been described. The technology of the present disclosure may be applied to a case other than such an example. For example, it may be applied to calibration of the position of the movable unit 11 having joints. In a case where the movable unit 11 having joints moves with six degrees of freedom, the encoder determines respective positions and open degrees of the joints. Accordingly, in a case where spatial coordinates of the joints when the movable unit 11 moves are different from assumed spatial coordinates of the joints, it is possible to determine the differences as errors, which enables application as a calibration technique for the movable unit 11.

The preferred embodiments of the present disclosure have been described in detail so far with reference to the accompanying drawings; however, a technical scope of the present disclosure is not limited to such examples. It is apparent that those skilled in the technical field of the present disclosure are able to conceive various modifications and alterations within a scope of the technical idea described in the claims, and it is understood that such modifications and alterations are also within the technical scope of the present disclosure.

In addition, the effects described herein are merely illustrative or exemplary, and are non-limiting. That is, the technology according to the present disclosure may exhibit, along with or instead of the above-described effects, other effects that are apparent to those skilled in the art from the description of the present specification.

It should be noted that the following configurations are also within the technical scope of the present disclosure.

(1)

An information processing apparatus including a position computer that computes, on a basis of first positional information obtained from reading of a projected marker by a first visual sensor and second positional information including positional information obtained from reading of the marker by a second visual sensor that moves relative to the first visual sensor, a position of a movable unit in which the second visual sensor is disposed.

(2)

The information processing apparatus according to (1), in which the position computer computes the position of the movable unit on the basis of the first positional information and the second positional information, and the second positional information includes positional information of the second visual sensor that is obtained through the first visual sensor.

(3)

The information processing apparatus according to (1) or (2), in which the first positional information includes a first positional relationship between, or first pose information about, the marker and the first visual sensor.

(4)

The information processing apparatus according to (3), in which the first positional relationship represents a distance and direction between the marker and the first visual sensor, and the first pose information is information about a rotational angle of the first visual sensor relative to the marker.

(5)

The information processing apparatus according to any one of (1) to (4), in which the second positional information includes a second positional relationship between, or second pose information about, the marker and the second visual sensor.

(6)

The information processing apparatus according to (5), in which the second positional relationship represents a distance and direction between the marker and the second visual sensor, and the second pose information is information about a rotational angle of the second visual sensor relative to the marker.

(7)

The information processing apparatus according to any one of (1) to (6), further including a three-dimensional information integrator that converts a first target moving position of the movable unit specified relative to a position of the first visual sensor into a second target moving position of the movable unit relative to a position of the second visual sensor.

(8) The information processing apparatus according to (7), further including a movable controller that computes the position of the movable unit on a basis of the second target moving position and the second positional information, and controls the position of the movable unit.

(9) The information processing apparatus according to any one of (1) to (8), further including a projection marker controller that controls a marker to be projected.

(10) The information processing apparatus according to (9), in which the projection marker controller controls, according to a range of vision of each of the first visual sensor and the second visual sensor, a place on which the marker is to be projected.

(11) The information processing apparatus according to (9) or (10), in which the projection marker controller creates the marker.

(12) The information processing apparatus according to any one of (1) to (11), in which the position computer computes, on a basis of a projection surface geometry, a position of a distal end of the movable unit at which the second visual sensor is disposed.

(13) The information processing apparatus according to any one of (1) to the marker includes visible light, infrared light, and ultraviolet light.

(14) The information processing apparatus according to any one of (1) to (13), in which the position computer computes a position of a distal end of the movable unit at which an end effector that grasps an object is provided.

(15) An information processing method including, on a basis of first positional information obtained from reading of a projected marker by a first visual sensor and second positional information including positional information obtained from reading of the marker by a second visual sensor that moves relative to the first visual sensor, computing a position of a movable unit in which the second visual sensor is disposed.

(16) An information processing system including:
a position computer that computes, on a basis of first positional information obtained from reading of a projected marker by a first visual sensor and second positional information including positional information obtained from reading of the marker by a second visual sensor that moves relative to the first visual sensor, a spatial position of a movable unit in which the second visual sensor is disposed;
a projector that projects the marker; and
the movable unit that is provided with the second visual sensor and that moves.

REFERENCE SIGNS LIST

10: Head unit
11: Movable unit
12: Body unit
13: Moving unit
14: Control unit
15: Storage unit
16: Communication unit
101: General-view camera
112: Hand-end camera
122: Projection surface geometry measuring sensor

The invention claimed is:

1. An information processing apparatus comprising a position computer that computes, on a basis of first positional information obtained from reading of a projected marker by a first visual sensor and second positional information including positional information obtained from reading of the marker by a second visual sensor that moves relative to the first visual sensor, a position of a movable unit in which the second visual sensor is disposed.

2. The information processing apparatus according to claim 1, wherein
the position computer computes the position of the movable unit on the basis of the first positional information and the second positional information, and
the second positional information includes positional information of the second visual sensor that is obtained through the first visual sensor.

3. The information processing apparatus according to claim 1, wherein the first positional information includes a first positional relationship between, or first pose information about, the marker and the first visual sensor.

4. The information processing apparatus according to claim 3, wherein
the first positional relationship represents a distance and direction between the marker and the first visual sensor, and
the first pose information is information about a rotational angle of the first visual sensor relative to the marker.

5. The information processing apparatus according to claim 1, wherein the second positional information includes a second positional relationship between, or second pose information about, the marker and the second visual sensor.

6. The information processing apparatus according to claim 5, wherein
the second positional relationship represents a distance and direction between the marker and the second visual sensor, and
the second pose information is information about a rotational angle of the second visual sensor relative to the marker.

7. The information processing apparatus according to claim 1, further comprising a three-dimensional information integrator that converts a first target moving position of the movable unit specified relative to a position of the first visual sensor into a second target moving position of the movable unit relative to a position of the second visual sensor.

8. The information processing apparatus according to claim 7, further comprising a movable controller that computes the position of the movable unit on a basis of the second target moving position and the second positional information, and controls the position of the movable unit.

9. The information processing apparatus according to claim 1, further comprising a projection marker controller that controls a marker to be projected.

10. The information processing apparatus according to claim 9, wherein the projection marker controller controls, according to a range of vision of each of the first visual sensor and the second visual sensor, a place on which the marker is to be projected.

11. The information processing apparatus according to claim 9, wherein the projection marker controller creates the marker.

12. The information processing apparatus according to claim 1, wherein the position computer computes, on a basis of a projection surface geometry, a position of a distal end of the movable unit at which the second visual sensor is disposed.

13. The information processing apparatus according to claim 1, wherein the marker includes visible light, infrared light, and ultraviolet light.

14. The information processing apparatus according to claim 1, wherein the position computer computes a position of a distal end of the movable unit at which an end effector that grasps an object is provided.

15. An information processing method comprising, on a basis of first positional information obtained from reading of a projected marker by a first visual sensor and second positional information including positional information obtained from reading of the marker by a second visual sensor that moves relative to the first visual sensor, computing a position of a movable unit in which the second visual sensor is disposed.

16. An information processing system comprising:
a position computer that computes, on a basis of first positional information obtained from reading of a projected marker by a first visual sensor and second positional information including positional information obtained from reading of the marker by a second visual sensor that moves relative to the first visual sensor, a spatial position of a movable unit in which the second visual sensor is disposed;
a projector that projects the marker; and
the movable unit that is provided with the second visual sensor and that moves.

\* \* \* \* \*